JAMES T. WILSON
ROTARY STEAM PLOW
106441
PATENTED AUG 16 1870
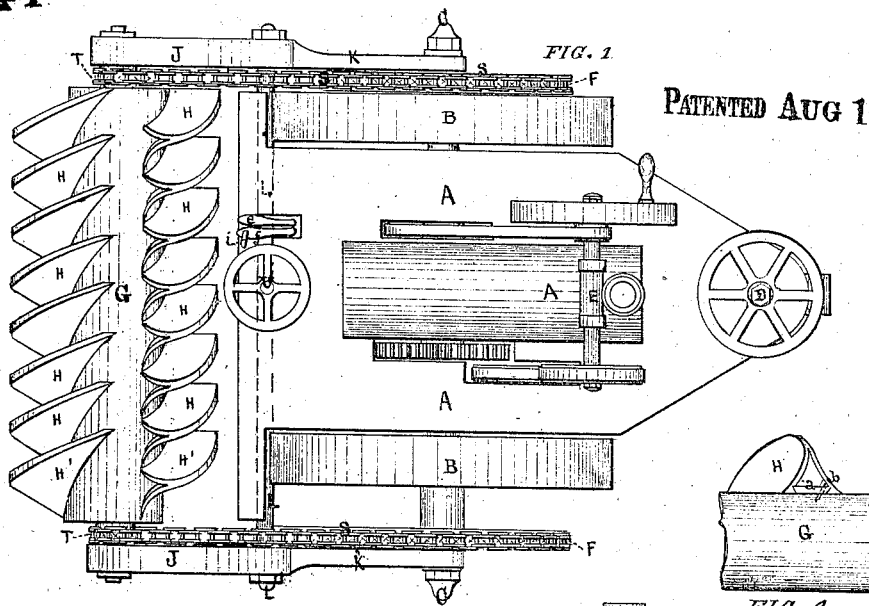
FIG. 1
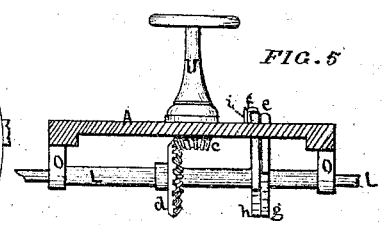
FIG. 4
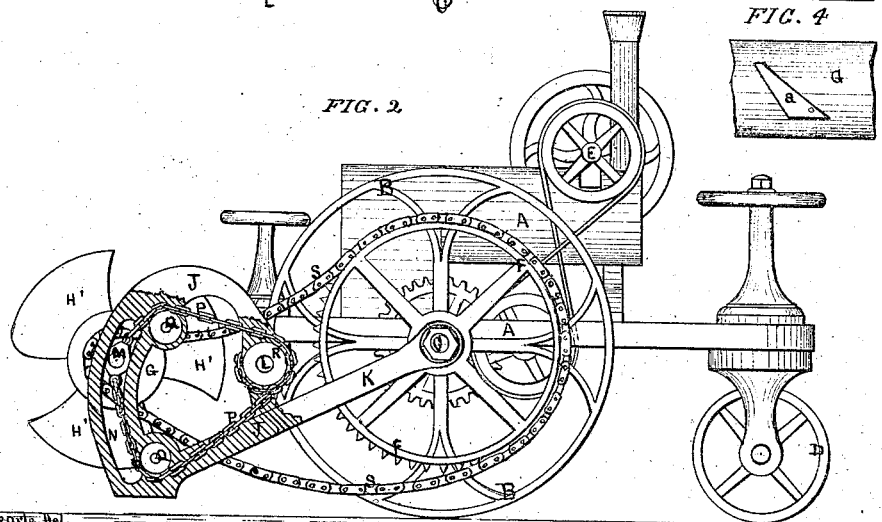
FIG. 2
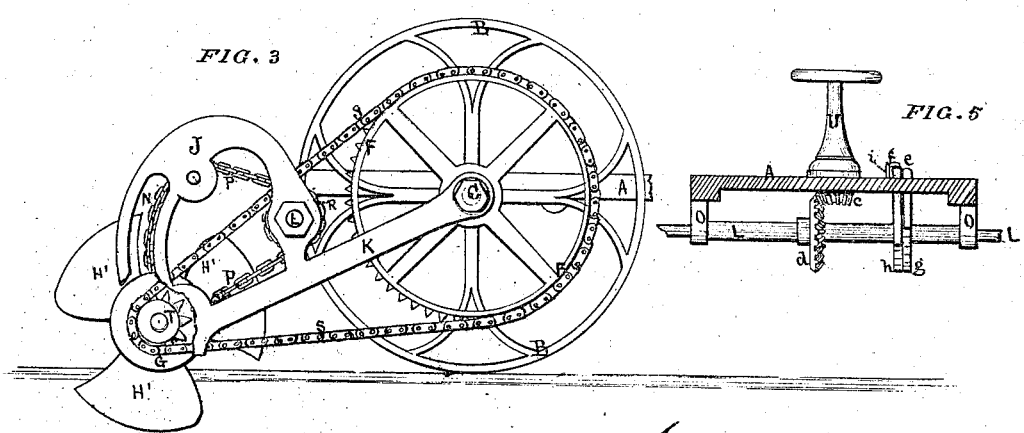
FIG. 3
FIG. 5
David A. Burr
S. O. R. Wilson
Witnesses
James T. Wilson
Inventor

United States Patent Office.

JAMES T. WILSON, OF ROCHESTER, NEW YORK.

Letters Patent No. 106,441, dated August 16, 1870.

IMPROVEMENT IN ROTARY STEAM-PLOWS.

The Schedule referred to in these Letters Patent and making part of the same

I, JAMES T. WILSON, of Rochester, in the county of Monroe and State of New York, have invented certain Improvements in Rotary Steam-Plows, of which the following is a specification.

The first part of my invention relates to the arrangement of the shares of a rotary plow upon its shaft or cylinder in longitudinal rows in such manner that the front cutting-edges of all the shares in each row shall be equidistant and project in a plane passing through the axis of the shaft or cylinder.

The rows are thus parallel to each other as well as to the axis of the shaft, and the plowshares are placed-upon right lines instead of upon a spiral curve as has heretofore been the case.

The object of this part of my invention is to secure greater uniformity and ease in the operation of the plowshares, and in the upturning of the soil thereby, than has heretofore been attained, and to increase also the tractive power of the engine.

The second part of my invention relates to improvements in the manner of suspending and of elevating and lowering the plow-shaft or cylinder of a rotary steam-plow by the use of arms projecting rearwardly on each side of the machine, from the axle of the traction-wheels, and carrying curved frames, which, extending out behind the locomotive, are securely upheld to sustain the plow-cylinder, by means of a transverse shaft extending from one to the other, under the rear end of the locomotive, and supported by suitable brackets, in which it is free to revolve.

The outer curved arms of the frame are slotted to receive bearing-blocks or journal-boxes, in which the gudgeons of the plow-shaft or cylinder are made to revolve.

These journal-boxes slide freely in the slots, said slots being so curved as that when the cylinder is lowered sufficiently to cause the plows to enter the ground, the chains by which motion is imparted to the cylinder from suitable cog-wheels on the driving-axle will be made tight; but when the cylinder is elevated, these chains will be so far slackened as to admit of their ready removal.

The sliding-boxes are moved by means of chains extending from each end thereof, over suitable friction-rollers, to drums on the shaft supporting the rear ends of the carrying-arms, so as to be operated by a revolution of said shaft produced at pleasure by a hand-wheel or other device.

In the accompanying drawing—

Figure 1 is a plan view of my improved steam-plow;

Figure 2, a side elevation thereof, with the curved frame of the supporting-arm on one side partially broken away, to disclose the sliding box, friction-rollers, and drum, on that side, by means whereof the cylinder it elevated or depressed;

Figure 3, a side elevation of one of the traction-wheels and of the cylinder, with a portion of the frame on the supporting-arm entirely broken away, disclosing the toothed wheel on one end of the cylinder carrying one of the driving-chains;

Figure 4, detached views, illustrating the manner of securing the plow-shares upon their shaft or cylinder; and Figure 5, a detached view of the mechanism for operating and controlling the shaft by which the cylinder is partially supported, and is elevated or depressed.

A is a locomotive engine, of any suitable description, supported upon a guiding-wheel, D, and two large traction-wheels, B B.

C is a revolving axle to which the traction-wheels are secured.

Motion is imparted to this axle C, and the wheels are consequently driven, by means of suitable gearing, connecting it with the driving-shaft E of the locomotive.

F F are large toothed wheels, of equal diameter, firmly secured upon each end of the axle C.

From these wheels motion is imparted to the plow-cylinder of the machine by means of open-link, endless chains, S S, meshing upon the teeth of said wheels, and of smaller toothed wheels secured upon the ends of the cylinder, inside of its bearings.

G is the revolving plow-shaft or cylinder;

T T, (see fig. 3,) the toothed driving-wheels on the ends thereof; and

H H H, the plowshares secured thereto.

These shares are, by preference, each constructed of a form, the design whereof I have made the subject of an application, now pending, for Letters Patent.

They are secured upon the cylinder G in longitudinal rows, as illustrated in fig. 1, with their rear bases in contact, and in a right line, so that the points of the shares in each row, separated by regular intervals, shall all project in a common plane, passing through the axis of the shaft or cylinder G, as seen in fig. 2.

I prefer to secure them each by means of a triangular, dovetailed projection, $a$, on the cylinder, (see fig. 4,) which shall fit into a corresponding recess in the under side of the share, otherwise shaped to conform accurately to the circumference of said cylinder, the share, when secured, being fastened by means of a screw or bolt, $b$.

Each share may thus be readily detached for repair or replacement.

K K are the projecting arms, and

J J, curved frames upon their rear ends, forming part thereof, by which the cylinder G is supported in the rear of the locomotive.

The forward ends of these arms rest upon and embrace the extreme outer ends of the axle C of the locomotive.

Their rear ends, carrying the curved frames J J, are upheld by means of a shaft, L, extending transversely from the one to the other, under the rear end of the platform of the locomotive, (see fig. 5,) and dotted lines, fig. 1, this shaft L being itself securely supported by means of suitable bearing-brackets, O O, fig. 5, in which it revolves. Its ends project through the inner arms of the curved frames J J, as shown in figs. 3 and 4.

The cylinder G is made longer than the distance between the traction-wheels B B, so that while one end thereof is placed in a plane coincident with the outer edge of the rim of the traction-wheel on the left of the engine, the other end will project out beyond the right-hand wheel far enough to bring the points of the outer plowshares thereon in a plane either coincident with the inner edge of the rim of said wheel, as illustrated in fig. 1, or which shall extend inside thereof.

To accommodate this extension of the cylinder beyond the right-hand wheel, the axle C is likewise extended out beyond the wheel to a corresponding extent, (see fig. 1,) the toothed wheel F, and the supporting-bar K, for that end of the cylinder being secured and supported at the end of the axle, as shown in fig. 1.

The outer arm or outer curve of each frame J J is slotted, as illustrated in figs. 2 and 3, to receive the bearings of the cylinder G.

These bearings are formed in blocks or journal-boxes, M, (see fig. 2,) which fit and slide accurately, yet easily, within these slots N N, and receive the gudgeons at the ends of the cylinder on which it revolves.

Between the frames J J and the ends of the cylinder G, the small toothed wheels T, (see figs. 1 and 3,) are placed to receive the endless open-link driving chains S S, by means whereof the cylinder G is made to revolve when the locomotive is in motion.

Owing to the difference in diameter of the toothed wheels F on the axle, and T on the cylinder, the latter is made to revolve with many times the rapidity of the former.

The journal-boxes M M, carrying the cylinder, are supported in their slots N, and the cylinder G is elevated or depressed by means of chains, P P, secured to the top and bottom of said boxes, and which extend thence over the upper and lower friction-rollers Q Q, fig. 2, secured in the frame J, above and below, and back to a roller or drum, R, working in a slot in the frame, and secured upon the end of the shaft L extending through the same.

The ends of the chains P P are fastened to this drum R, so that by revolving the shaft L the one shall be wound up and the other unwound, drawing, thereby, the journal-boxes M, and, consequently, the cylinder G, turning therein, up or down in the slots N, in which said boxes slide.

The curve of these slots is such as that the lower ends thereof form each the arc of a circle, having the axis of the toothed wheel F or F as a center, said arc being in length equal to the extreme depth to which it is desired that the plowshares H, upon the cylinder, shall enter the ground.

By this means the tension of the open-link chain S, by which the cylinder is driven, remains the same from the time the plows reach the ground until they reach their greatest depth, and their further depression is prevented by the termination of the slots N.

Above this arc in the slots N N, however, the curve thereof corresponds to an arc of much smaller radius, so that the cylinder is elevated, and the toothed wheel T, thereon, is brought nearer to the axis of the larger toothed wheel, and the driving-chain S, extending from the one to the other, consequently becomes slacked sufficiently to allow a ready removal thereof from the one and the other.

The shaft L, carrying the drums R R, is made to revolve, so as to elevate or depress the cylinder by means of the chains P and sliding-boxes M, as just described, by means of a vertical post, U, on the platform of the locomotive, operated by a hand-wheel and carrying on its lower end a beveled spur-wheel, c, gearing into a counterpart wheel, d, on the shaft L, as illustrated in fig. 5.

The cylinder G is secured at any height when lifted up, by means of a pawl, e, which engages a ratchet-wheel, g, on the shaft, and which prevents a reverse movement as the chains lifting the cylinder are drawn up.

A second pawl, f, engaging a second ratchet-wheel, h, on the same shaft, having teeth inclined in a direction the reverse of the first, serves to hold the cylinder down when depressed, and thus prevent it from jumping from the ground.

Both pawls are so arranged as to be operated by the foot of the plowman from the platform of the locomotive, as shown in fig. 5; but the pawl e is held by a catch, i, figs. 1 and 5, which prevents it from operating, except when the nature of the ground requires it, and it is therefore released and made to act by the plowman.

When this improved machine is not at work, or is being moved from place to place, the cylinder G is elevated by means of the hand-wheel on the post U, so as to lift its plowshares H H H entirely above the ground, and it is prevented from dropping back by the action of the pawl e on the ratchet-wheel g.

When the cylinder is thus elevated the driving-chains S S are easily thrown off from the toothed driving-wheels F F, so that while the locomotive is being driven to the field for work, the cylinder does not revolve but remains at rest.

Upon reaching the field for work, the driving-chains S S are thrown over the toothed wheels F F and L L, and the cylinder, with its attached plows, is allowed to drop by disengaging the pawl e.

The curved form of the slots N N, in which the journal-ends of the cylinder move, will cause these chains to tighten as the plows approach the ground.

The combined weight of the cylinder and plows will suffice to give the plowshares a firm hold upon the ground.

So soon now as the locomotive is started, the cylinder G is made to revolve by means of the driving-chains S S connecting it with the revolving axle of the traction-wheels B B, carrying the locomotive, and the rows of plow shares are successively forced into and through the ground, turning it up and throwing it over with all the nicety and precision of an ordinary plow, but to a far greater depth.

The depth of the plowing is regulated by the height of the cylinder above the ground, which is adjusted by the hand-wheel U and pawl e, as above described, and also by the size of the plowshares.

The number of rows of plowshares on the revolving cylinder is regulated entirely by the size of the shares, and is reduced as their size is increased, or *vice versa*.

As the cylinder is extended, so as to project beyond the outer rim of the right-hand wheel, the track of said wheel is plowed up by the following shares, so that by running this wheel close to the edge of ground already plowed the new furrow will overlap it.

I claim as my invention—

1. The arrangement of a series of shares and moldboards with or upon a rotary shaft or cylinder in two or more parallel rows, so that the cutting-edges of the shares shall project therefrom radially, and their points in each row all be formed in a plane passing through the axis of the shaft, substantially in the manner and for the purpose herein set forth.

2. In combination with the sliding-boxes M M, carrying the journals of the shaft G of a rotary plow, the chains P P and revolving shaft L, for operating the same, substantially as and for the purpose herein set forth.

3. Curved slots, N N, formed in supporting frames J J, projecting from the carriage A, as guides for the sliding journal-boxes M M of a rotary plow, the curvature of each slot being such as to describe in its length arcs of different radii, for the purpose of loosening the chain when the cylinder is elevated, substantially as herein set forth.

JAMES T. WILSON.

Witnesses:
J. O. R. WILSON,
DAVID A. BURR.